United States Patent
Kim et al.

(10) Patent No.: US 8,830,855 B2
(45) Date of Patent: Sep. 9, 2014

(54) METHOD AND APPARATUS FOR ALLOCATING RESOURCE IN MOBILE WIRELESS NETWORK

(75) Inventors: Keun Young Kim, Seongnam-si (KR); Dong Hyun Ahn, Daejeon (KR); Choongil Yeh, Daejeon (KR); Wooram Shin, Daejeon (KR); Jihyung Kim, Daejeon (KR); Dong Seung Kwon, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 340 days.

(21) Appl. No.: 13/335,193

(22) Filed: Dec. 22, 2011

(65) Prior Publication Data

US 2012/0163316 A1 Jun. 28, 2012

(30) Foreign Application Priority Data

Dec. 23, 2010 (KR) ........................ 10-2010-0133620

(51) Int. Cl.
*H04W 88/00* (2009.01)
*H04W 28/18* (2009.01)

(52) U.S. Cl.
CPC ..................................... *H04W 28/18* (2013.01)
USPC ......................................... 370/252; 370/330

(58) Field of Classification Search
None
See application file for complete search history.

(56) References Cited

U.S. PATENT DOCUMENTS

| 8,311,554 | B2 * | 11/2012 | Abedi .......................... 455/454 |
| 8,553,594 | B2 * | 10/2013 | Baum et al. ................... 370/310 |
| 2007/0211757 | A1 | 9/2007 | Oyman |
| 2008/0076432 | A1 * | 3/2008 | Senarath et al. .............. 455/442 |
| 2008/0233966 | A1 * | 9/2008 | Scheim et al. ............. 455/452.1 |
| 2009/0191888 | A1 * | 7/2009 | Abedi .......................... 455/450 |

FOREIGN PATENT DOCUMENTS

| KR | 10-2009-0106053 | 10/2009 |
| KR | 10-2010-0054901 | 5/2010 |

OTHER PUBLICATIONS

Chorist (Integrating Communications for Enhanced Environmental Risk Management and Citizens Safety), European Commission—033685, Jul. 31, 2009.
IEEE Std 802.11, 2007.

* cited by examiner

*Primary Examiner* — John Blanton
*Assistant Examiner* — Jay P Patel
(74) *Attorney, Agent, or Firm* — NSIP Law (57) ABSTRACT

In a mobile wireless network system including a plurality of nodes, available resources of a transmitting node and available resources of a receiving node are searched for. Commonly overlapped allocatable resources among available resources of a transmitting node and available resources of a receiving node are searched for, areas corresponding to the calculated allocation resource number according to an allocation condition that is set in the allocatable resource area are selected, and the areas are allocated to the transmitting node or the receiving node.

15 Claims, 8 Drawing Sheets

FIG. 1

◯ : NODE

METHOD AND APPARATUS FOR ALLOCATING RESOURCE IN MOBILE WIRELESS NETWORK

CROSS-REFERENCE TO RELATED APPLICATION

This application claims priority to and the benefit of Korean Patent Application No. 10-2010-0133620 filed in the Korean Intellectual Property Office on Dec. 23, 2010, the entire contents of which are incorporated herein by reference.

BACKGROUND OF THE INVENTION (a) Field of the Invention

The present invention relates to resource allocation. More particularly, the present invention relates to a method and apparatus for allocating resources in a mobile wireless network.

(b) Description of the Related Art

An existing mobile wireless network system, for example, a wireless mesh network or a mobile Ad-hoc network system, is an asynchronous-based system in which synchronization between nodes is not considered, and is not an orthogonal frequency division modulation access (OFDMA)-based system and thus does not consider resource allocation for a frequency domain. The OFDMA uses a method that is basically applied to a cellular network and has never been applied to a wireless mesh network or a mobile ad-hoc network.

A cellular mobile communication system that uses only single hop communication is a centralized system in which a central control system, which is a base station, manages resource allocation, but because each node performs a process of distributively requesting and allocating resources in a multi-hop wireless network like a wireless mesh network or a mobile Ad-hoc network, a method of allocating resources with a completely different scheme is necessary.

Further, in a wireless mesh network or a mobile ad-hoc network, because a problem of a hidden node and an exposed node may occur, a method of allocating resources in consideration of this is necessary.

SUMMARY OF THE INVENTION

The present invention has been made in an effort to provide a method and apparatus for allocating resources in a mobile wireless network having advantages of allocating resources in an OFDMA-based mobile wireless network system.

The present invention has been made in a further effort to provide a method and apparatus for allocating resources in a mobile wireless network having advantages of allocating resources for transmission or reception in an OFDMA-based wireless mesh network system or a mobile ad-hoc network system.

An exemplary embodiment of the present invention provides a method of allocating resources to a node in a mobile wireless network system including a plurality of nodes, the method including: searching for available resources of a transmitting node; searching for available resources of a receiving node; searching for an area of commonly overlapped allocatable resources in the available resources of the transmitting node and the available resource of the receiving node; calculating the number of allocation resources based on a size of data to transmit or to receive; and selecting areas corresponding to the calculated allocation resource number according to an allocation condition that is set in the allocatable resource area and allocating the selected areas to the transmitting node or the receiving node.

Another embodiment of the present invention provides an apparatus for allocating resources to a node in a mobile wireless network system including a plurality of nodes, the apparatus including: a resource area search unit that searches for available resources of a transmitting node and that searches for available resources of a receiving node; a common resource acquisition unit that searches for an area of commonly overlapped allocatable resources in the available resources of the transmitting node and the available resources of the receiving node; an allocation number calculation unit that calculates the number of allocation resources based on a size of data to transmit or to receive; and an allocation processor that selects areas corresponding to the calculated allocation resource number according to an allocation condition that is set in the allocatable resource area and that allocates the areas to the transmitting node or the receiving node.

In the present invention having such characteristics, an allocatable resource area can be selected based on a time/frequency domain in which a transmitting node can transmit, a time/frequency domain in which a receiving node can receive, all frequency domain positions within a time domain in which the transmitting node is presently receiving, and all frequency domain positions within a time domain in which the receiving node is presently transmitting.

A time/frequency domain in which the transmitting/receiving node can transmit/receive can be acquired by carrier sensing, or by receiving an allocation related control message of a peripheral node.

DETAILED DESCRIPTION OF THE EMBODIMENTS

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In addition, in the entire specification, unless explicitly described to the contrary, the word "comprise" and variations such as "comprises" or "comprising" will be understood to imply the inclusion of stated elements but not the exclusion of any other elements.

Hereinafter, a method and apparatus for allocating resources according to an exemplary embodiment of the present invention will be described with reference to the drawings.

Figure 1:
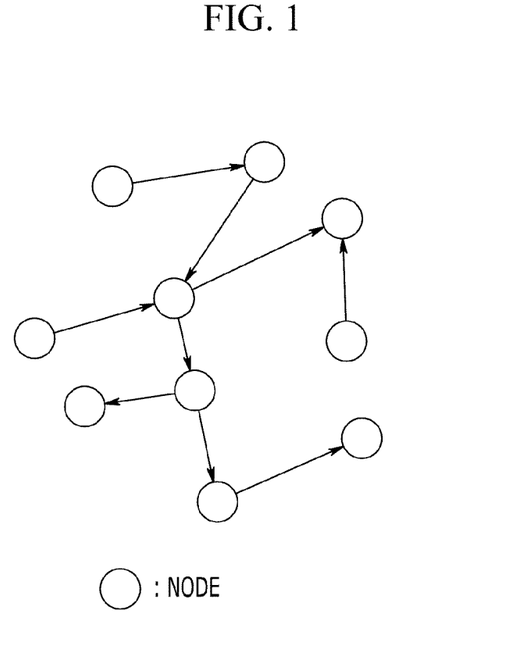
FIG. 1 is a diagram illustrating data transmission between nodes in a mobile wireless network system according to an exemplary embodiment of the present invention.

FIG. 1 is a diagram illustrating data transmission between nodes in a mobile wireless network system according to an exemplary embodiment of the present invention. A mobile wireless network system according to an exemplary embodiment of the present invention represents a network system in which each node constituting a network performs a process of distributively requesting and allocating resources like a wireless mesh network or a mobile ad-hoc network instead of a centralized method in which a central control system manages resource allocation like a base station.

As shown in FIG. 1, a mobile wireless network system according to an exemplary embodiment of the present invention includes a plurality of nodes. Each node can communicate with an adjacent node. An adjacent node is a node that is positioned adjacent to each node, a logical link can be formed between each node and an adjacent node, and data can be transmitted and received through the formed link. Further, each node can acquire a previously allocated resource area by carrier sensing or receiving a control message that is transferred between peripheral nodes.

Figure 2:
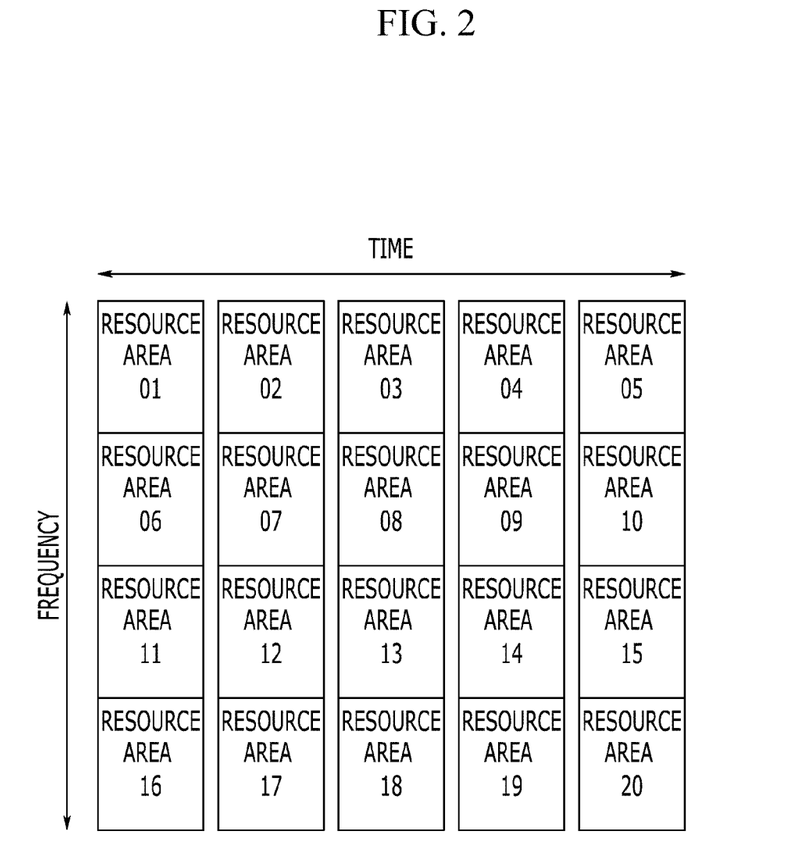
FIG. 2 is a diagram illustrating radio resources according to an exemplary embodiment of the present invention.

FIG. 2 is a diagram illustrating radio resources according to an exemplary embodiment of the present invention.

Radio resources according to an exemplary embodiment of the present invention are orthogonal frequency/time division synchoronized radio resources, are divided into a time domain and a frequency domain, and have a structure in which resource areas are arranged along a time axis and a frequency axis. One resource area is formed with a plurality of resource units, and a resource unit is an area that is formed by one subcarrier and one symbol (OFDM symbol).

Figure 3:
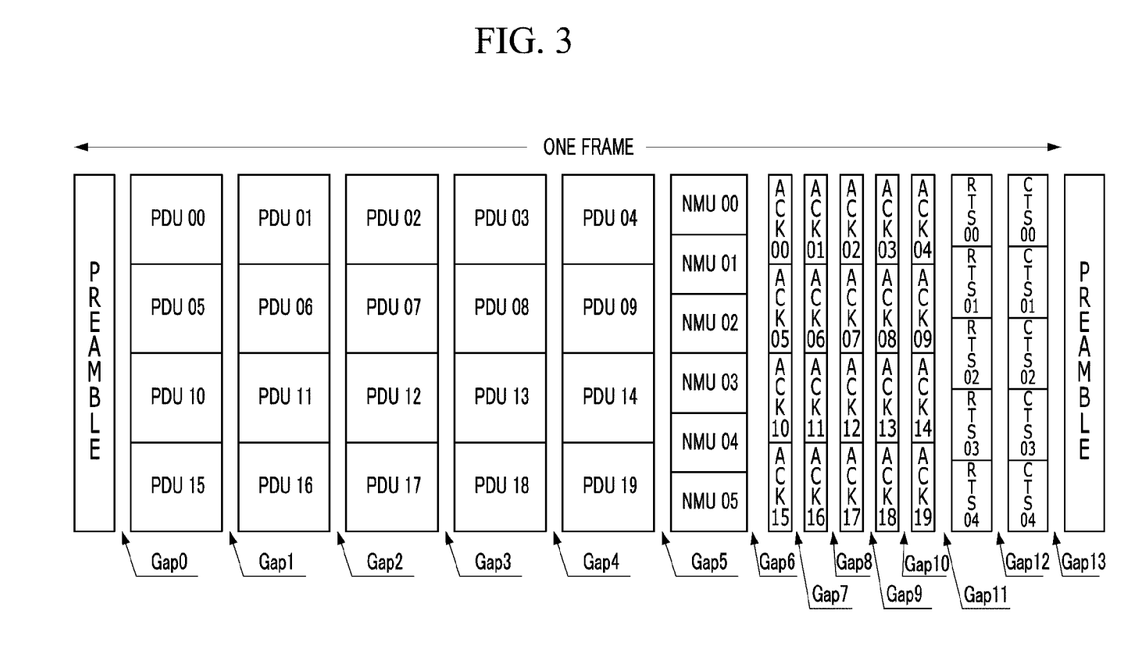
FIG. 3 is a diagram illustrating a structure of a frame according to an exemplary embodiment of the present invention.

FIG. 3 is a diagram illustrating a structure of a frame according to an exemplary embodiment of the present invention based on radio resources of FIG. 2.

A frame according to an exemplary embodiment of the present invention includes a plurality of packet data unit (PDU) slots PDU00-PDU19, a plurality of acknowledgement (ACK) slots ACK00-ACK19, as shown in FIG. 3 and that further include a preamble, request to send (RTS) slots RTS00-RTS04, and clear to send (CTS) slots CTS00-CTS04 in addition thereto.

In a frame according to an exemplary embodiment of the present invention, PDU slots of the N (N=a positive integer) number are positioned, and ACK slots of the N number, which is the same number as that of the PDU slots and one-to-one mapping with PDU slots, are positioned. The L (L=a positive integer) number of RTS slots are positioned next to the ACK slots, and finally, CTS slots of the same number as that of the RTS slots are positioned. In consideration of an RF switching time and a time necessary for decoding, a gap time in which transmission does not occur can be defined between slots, and a gap represents an interval that does not allow transmission in consideration of a time that is consumed for decoding and transmission/reception conversion.

The PDU slots PDU00-PDU19 are slots or channels corresponding to a time/frequency position that is used when transmitting user data, and the ACK slots ACK00-ACK19 are slots or channels that are used for notifying reception success/failure of a corresponding PDU. The preamble is a space for signal transmission or signal intensity measurement for synchronization between nodes, the RTS slots RTS00-RTS04 are slots or channels that are used for a PDU occupancy request in order to reserve a time/frequency domain for transferring data, and the CTS slots CTS00-CTS04 are slots or channels that are used for permitting a PDU occupancy request using the RTS slot.

A vertical axis of a frame of such a structure represents subcarrier order, and a horizontal axis represents OFDMA symbol order. Because a slot functions as an individual communication channel, nodes can transmit and receive an individual message using each slot corresponding to a resource unit and an individual node can simultaneously proceed a plurality of slots due to OFDMA characteristics, and thus a frame having a structure of an exemplary embodiment of the present invention can easily support a multi-channel wireless ad-hoc network configuration that supports multi-channel random multi-access and multi-hop connection.

In radio resources having a structure of FIGS. 2 and 3, a resource area in which the node can transmit data is a commonly overlapped area in resources that a transmitting/receiving node can use, i.e., available resources. In order to determine available resources, each node can perform a carrier sensing method or an allocation area information collection method.

The carrier sensing method is a method of searching for an empty resource area by performing carrier sensing of radio resources, and the allocation area information collection method is a method in which each node collects information that is provided from a peripheral node, i.e., information on resources that a corresponding node can use, through reception of a control message of the peripheral node, and searches for an empty resource area in radio resources based on the collected information.

In this way, when each node determines available resources and transmits data, the transmitting/receiving node should search for a resource area that it can commonly use among available resources.

For example, a transmitting node to transmit data searches for a position of an empty resource area by performing carrier sensing of radio resources, and the receiving node searches for a position of an empty resource area in radio resources by performing carrier sensing. Data can be transmitted only through an empty resource area in which the transmitting node and the receiving node are commonly found among empty resource areas in which the transmitting/receiving node are each found.

In this case, because the transmitting/receiving node cannot simultaneously perform transmission/reception in the same time domain, the transmitting/receiving node should exclude a time domain in which the transmitting node receives data and a time domain in which the receiving node transmits data from commonly empty resource areas.

Accordingly, in an exemplary embodiment of the present invention, resources are allocated in consideration of the following contents. When allocating resources to data, i.e., a PDU, the following contents are considered.

1) A position of a PDU slot in which the transmitting node can transmit,

2) A position of a PDU slot in which the receiving node can receive,

3) A position C of all frequency domains within a time domain in which the transmitting node is presently receiving, and 4) A position D of all frequency domains within a time domain in which the transmitting node is presently transmitting.

Here, the position A of a PDU slot in which the transmitting node can transmit represents a position of PDU slots corresponding to a position of ACK slots that are determined as slots that are not using by performing carrier sensing of ACK slots of a frame. For example, in FIG. 1, when ACK00 is determined to be an empty slot that is not in use, PDU00 of a position corresponding to ACK00 is determined as a PDU slot that can transmit.

The position B of a PDU slot in which the receiving node can receive represents a position of PDU slots that are not in use and is found by performing carrier sensing of PDU slots of a frame.

The reason why the transmitting node performs carrier sensing of an ACK slot and the receiving node performs carrier sensing of a PDU slot is to solve a problem of a hidden node/exposure node.

In consideration of the above-described A, B, C, and D, a resource area satisfying a condition of Equation 1 is selected as an area for allocation.

$$A \cap B - C - D \quad \text{[Equation 1]}$$

An area satisfying Equation 1 can be used as an allocatable resource area.

Next, a process of searching for available resources according to an exemplary embodiment of the present invention will be described with reference to FIGS. 4 to 6.

Figure 4:
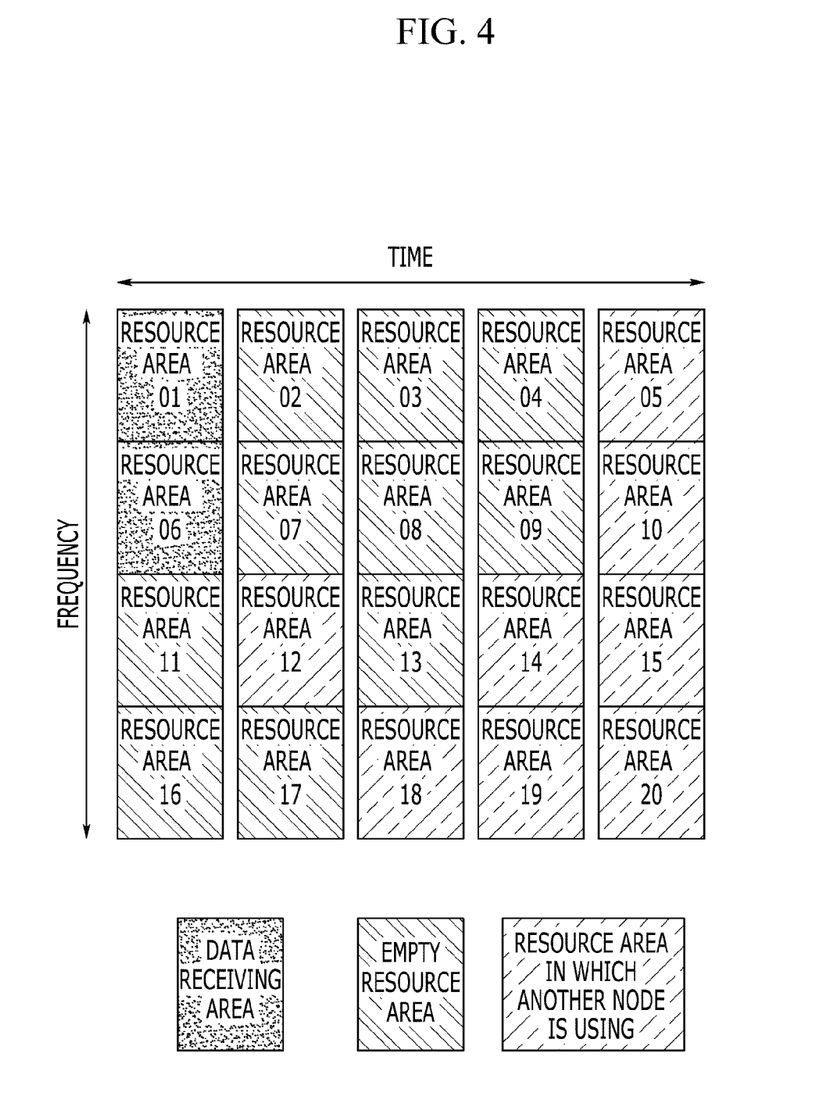
FIG. 4 is a diagram illustrating available resources of a transmitting node according to an exemplary embodiment of the present invention.
Figure 5:
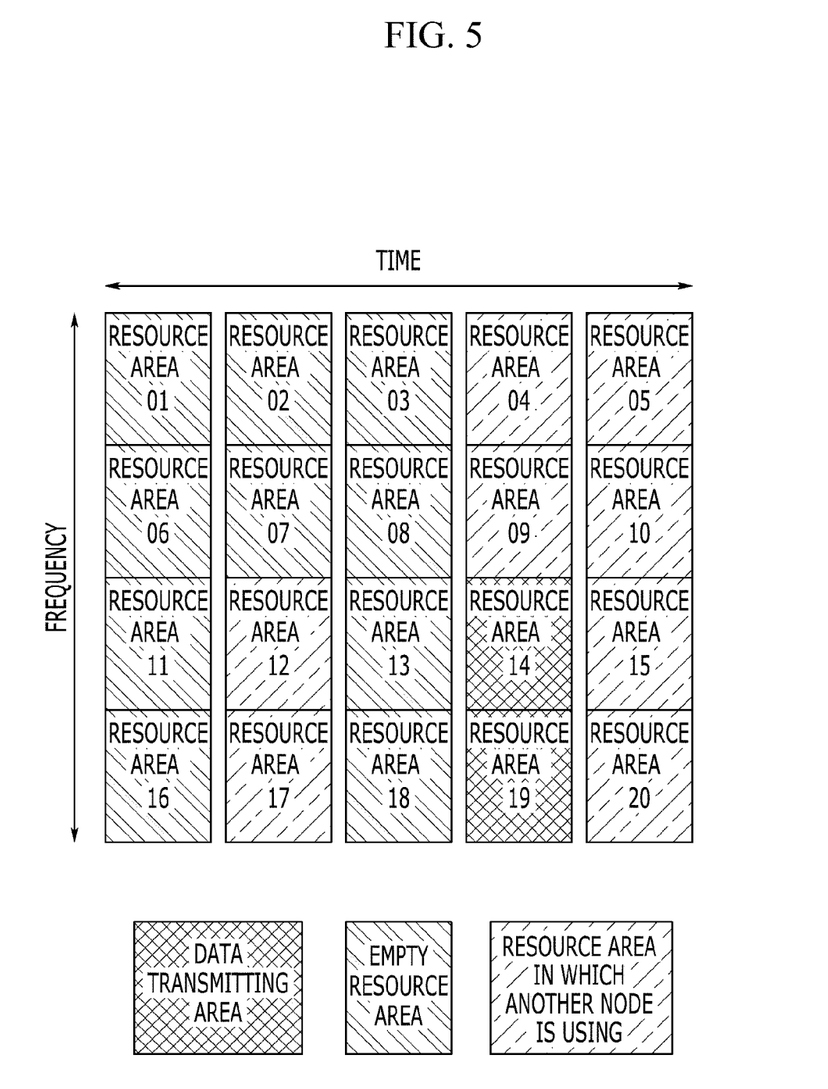
FIG. 5 is a diagram illustrating available resources of a receiving node according to an exemplary embodiment of the present invention.
Figure 6:
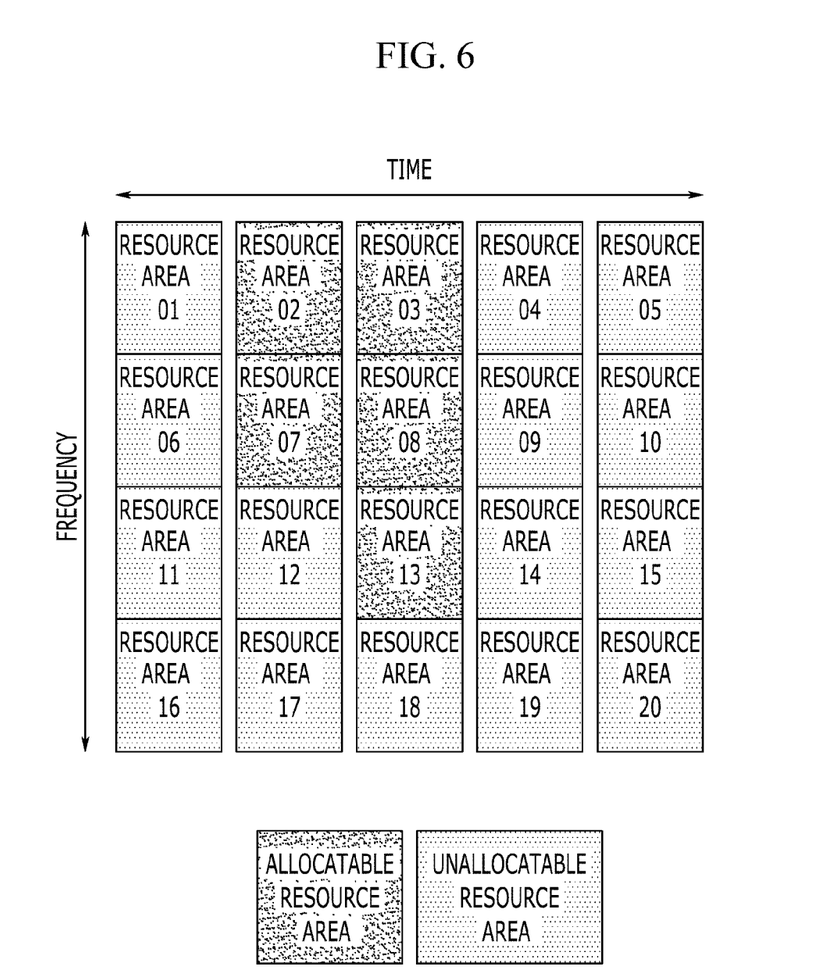
FIG. 6 is a diagram illustrating resources that can be allocated to transmit and receive data of a transmitting/receiving node according to an exemplary embodiment of the present invention.

FIG. 4 is a diagram illustrating available resources of a transmitting node, FIG. 5 is a diagram illustrating available resources of a receiving node, and FIG. 6 is a diagram illustrating resources that can be allocated to transmit and receive data of a transmitting/receiving node. Here, it is exemplified that a transmitting/receiving node searches for available resources through carrier sensing, but the present invention is not limited thereto.

It is assumed that the transmitting node to transmit data has found empty resource areas 02-04, 07-09, 11, 13, 16, and 17 and resource areas 05, 10, 12, 14, 15, and 18-20 that another node is using, and knows data receiving areas 01 and 06 in which the transmitting node presently receives data through carrier sensing in radio resources, as shown in FIG. 4.

Further, it is assumed that the receiving node to receive data has found empty resource areas 01-03, 06-08, 11, 13, 16, and 17 and resource areas 04, 05, 09, 10, 12, 15, 17, and 20 that another node is using, and knows data transmission areas 14 and 19 in which the receiving node presently transmits data through carrier sensing in radio resources, as shown in FIG. 5.

In such a state, when the transmitting node and the receiving node attempt to transmit and receive data, the transmitting node and the receiving node should search for a commonly overlapped area in empty resource areas that the transmitting node and the receiving node each find.

The transmitting/receiving node can search for allocatable resource areas 02, 03, 07, 08, and 13, which are empty resource areas that the transmitting/receiving node can commonly use, as shown in FIG. 6, based on carrier sensing results, and a data transmitting/receiving area of a corresponding node that is described with reference to FIGS. 4 and 5. The remaining areas, except for allocatable resource areas 02, 03, 07, 08, and 13, are processed as unallocatable resource areas 01, 04, 06, 09, 10, 11, 12, 14, 15, and 16-20.

Some or all allocatable resource areas 02, 03, 07, 08, and 13 may become areas in which data are actually transmitted.

In this case, when transmitting data through a plurality of time domains in the same frequency domain, a transmission radius in which data can be transmitted can be enlarged, but because the transmitting/receiving node cannot simultaneously transmit and receive data in one time domain, the transmitting/receiving node does not use other frequency domains and thus a loss may occur. Further, when transmitting data through a plurality of frequency domains in the same time domain, data can be transmitted and received through other time domains and thus resources can be efficiently used.

Therefore, in an exemplary embodiment of the present invention, in order to efficiently use radio resources, each node can set resource areas satisfying the following allocation condition in allocatable resource areas as resources for transmitting or receiving data.

1) When an allocatable resource area exist within a time domain in which the node is already transmitting, the node selects at least one of frequency domains that can allocate resources within a corresponding time domain and transmits data. However, when a time domain in which the node is already transmitting does not exist, the node selects at least one of plurality of frequency domains within an allocatable resource area and transmits data.

2) When all data to transmit can be transmitted through an allocatable resource area within a frame, the node transmits data through a plurality of time domains. In order to enlarge the transmission radius, the node preferentially selects PDU slots having the same frequency domain from a plurality of time domains and transmits data through the selected PDU slots.

3) When transmitting data requiring a wide transmission radius, the node preferentially selects PDU slots of an area having the same frequency from an allocatable resource area and transmits data through the selected PDU slots.

In this way, the node selects resource areas satisfying at least one of the above allocation conditions from allocatable resource areas, and the selected resource area is referred to as an "allocation area".

In order to transmit actual data, a position of resource areas for transmission and the number of resource areas necessary for transmitting all corresponding data should be obtained.

The number of allocated resource areas changes according to the number of data bits that can be sent through one resource area. The number of data bits that can be sent through one resource area is determined based on the number (carrier number and symbol number), a modulation method, and a channel coding method of resource units constituting a resource area. It is assumed that the carrier number is $\alpha$, the symbol number is $\beta$, a modulation rate according to a modulation method is $\gamma$, and a channel coding rate is $\delta$. Here, for example, when the modulation method is quadrature phase shift keying (QPSK), $\gamma=2$, when the modulation method is 8-phase shift keying (8-PSK), $\gamma=3$, when the modulation method is 16-quadrature amplitude modulation (QAM), $\gamma=4$, when the modulation method is 32-QAM, $\gamma=5$, and when the modulation method is 64-QAM, $\gamma=6$.

When it is assumed that all subcarriers and symbols constituting a resource area are used for transmitting data, the number $Bit_{No}$ of data bits that can be sent to one resource area is represented by Equation 2.

$$Bit_{No} = \alpha \times \beta \times \gamma \times \delta \quad \text{[Equation 2]}$$

When the number of resource areas to transmit actual data, i.e., allocatable resource areas, within a frame is a and the number of resource areas necessary for transmitting all data is b, the number $Slot_{No}$ of resource areas that are allocated within a frame is represented by Equation 3.

$$Slot_{No} = [b/\lceil b/a \rceil] \quad \text{[Equation 3]}$$

wherein, ⌈a⌉ is a maximum integer that does not exceed a.

The number b of resource areas necessary for transmitting all data may be calculated based on a total amount of data to be transmitted and the number $Bit_{No}$ of data bits that can be sent to one resource area.

Next, the above-described resource allocation apparatus for allocating resources according to an exemplary embodiment of the present invention will be described.

Figure 7:
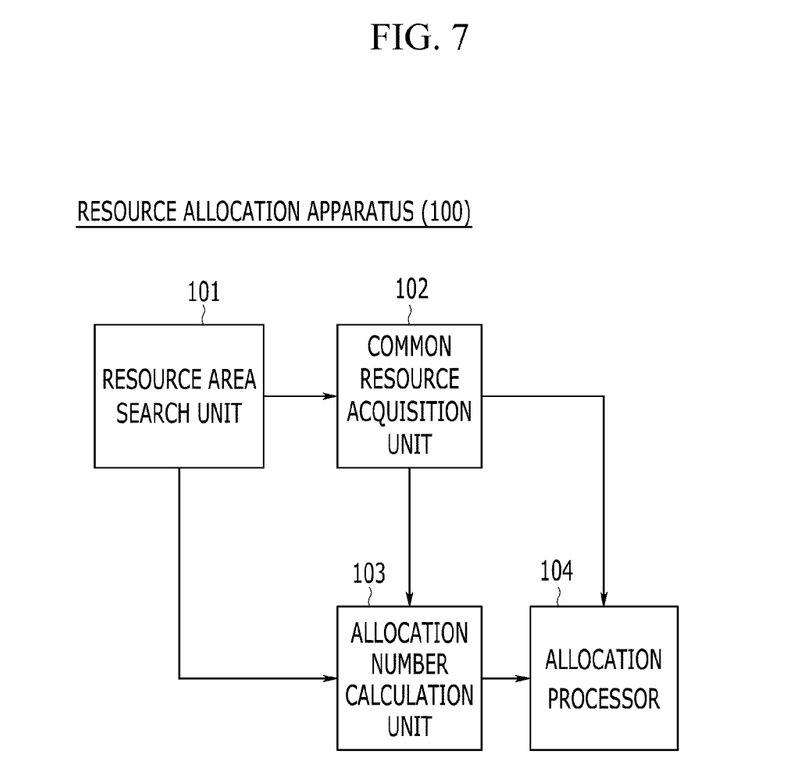
FIG. 7 is a diagram illustrating a configuration of a resource allocation apparatus according to an exemplary embodiment of the present invention.

FIG. 7 is a diagram illustrating a configuration of a resource allocation apparatus according to an exemplary embodiment of the present invention.

In a mobile wireless network system according to an exemplary embodiment of the present invention, each node includes an apparatus for allocating resources, and a resource allocation apparatus 100 includes a resource area search unit 101, a common resource acquisition unit 102, an allocation number calculation unit 103, and an allocation processor 104, as shown in FIG. 7.

The resource area search unit 101 searches for available resources using a method such as carrier sensing or an allocation area information collection method as described above, and searches for each of available resources of a node thereof, i.e., a transmitting node to transmit data, and available resources of a node to which a corresponding node is to transmit data, i.e., a receiving node.

The common resource acquisition unit 102 acquires an allocatable resource area, which is a commonly overlapped common resource of a transmitting/receiving node, among available resources of the transmitting node and available resources of the receiving node.

The allocation number calculation unit 103 calculates the number of resource areas that are allocated within a frame, i.e., the number of allocation resources, based on the number of allocatable resource areas within a frame, and the number of resource areas necessary for transmitting all data. Here, the number of resource areas necessary for transmitting all data may be calculated based on a total amount of data to be transmitted and the number of data bits that can be sent through one resource area.

The allocation processor 104 allocates resources to a corresponding node based on the calculated allocation resource number and an allocatable resource area, which is a common resource of the transmitting node and the receiving node. Particularly, the allocation processor 104 selects resource areas corresponding to the calculated allocation resource number according to an allocation condition in an allocatable resource area, and provides the resource area as an allocation area for transmitting or receiving data of a corresponding node.

Next, a method of allocating resources according to an exemplary embodiment of the present invention will be described.

Figure 8:
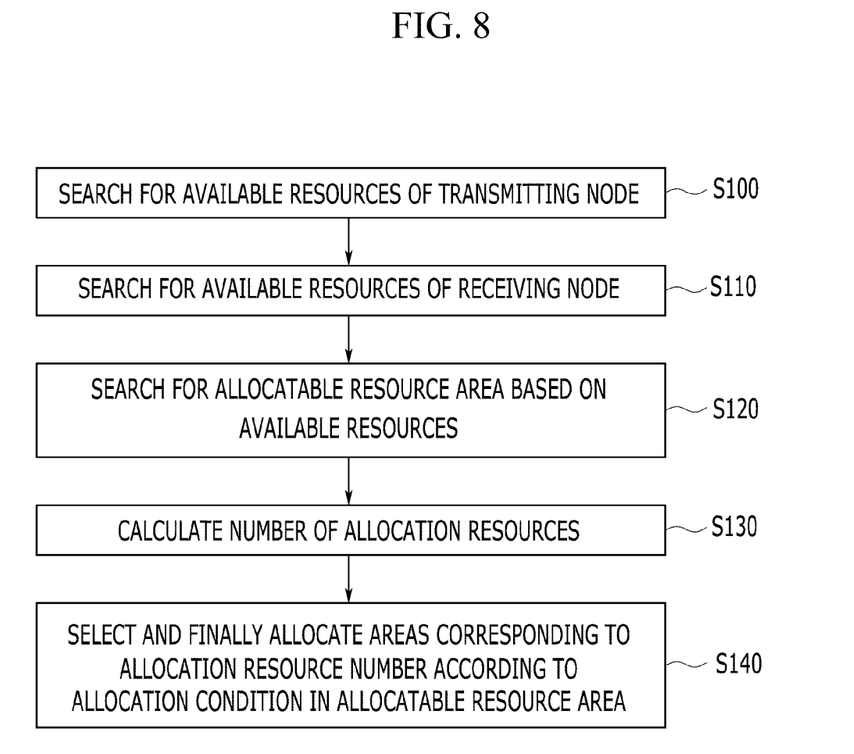
FIG. 8 is a flowchart illustrating a method of allocating resources according to an exemplary embodiment of the present invention.

FIG. 8 is a flowchart illustrating a method of allocating resources according to an exemplary embodiment of the present invention.

When transmitting data, the resource allocation apparatus 100 searches for available resources using a method such as carrier sensing or an allocation area information collection method (S100) and searches for available resources of a node to transmit data, i.e., a receiving node, in addition to available resources that the resource allocation apparatus 100 can use (S110). The resource allocation apparatus 100 searches for available resources of a receiving node based on information that is transferred from the receiving node. The receiving node transmits, for example, a CTS PDU including information about resources that the receiving node can use as a response to an RTS PDU that requests slot occupancy from the transmitting node, and the resource allocation apparatus 100 searches for available resources of the receiving node based on information of the CTS PDU.

When available resources of the transmitting node and available resources of the receiving node are found, the resource allocation apparatus 100 searches for a commonly overlapped area of a transmitting/receiving node among available resources as an allocatable resource area (S120).

Next, the resource allocation apparatus 100 calculates the number of resources to allocate according to the quantity of data to transmit. The resource allocation apparatus 100 calculates the number of allocation resources that can be allocated within a frame based on Equations 2 and 3 (S130).

The resource allocation apparatus 100 selects an allocation area based on the allocation area and the calculated allocation resource number. That is, the resource allocation apparatus 100 selects an area corresponding to the calculated allocation resource number according to an allocation condition in an allocatable resource area of a frame and uses the area as resources for transmitting data (S140). In this way, a node transmits or receives data through the selected resource.

Even when such a resource allocation process is performed at a receiving node side, the resource allocation process is performed with the same method, and in this case, the resource allocation apparatus of the receiving node searches for, for example, available resources of the transmitting node based on information about available resources of the transmitting node that is included in an RTS PDU that performs a slot occupancy request that is transmitted from the transmitting node.

According to an exemplary embodiment of the present invention, in an OFDMA-based wireless mesh network system or a mobile ad-hoc network system, a position and size to which resources are allocated can be set. Thereby, each node can allocate resources according to a transmitting/receiving state thereof without a collision.

An exemplary embodiment of the present invention may be not only embodied through the above-described apparatus and/or method but also through a program that executes a function corresponding to a configuration of the exemplary embodiment of the present invention or through a recording medium on which the program is recorded, and can be easily embodied by a person of ordinary skill in the art from the description of the foregoing exemplary embodiment.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method of allocating resources to a node in a mobile wireless network system comprising a plurality of nodes, the method comprising:
   searching for available resources of a transmitting node;
   searching for available resources of a receiving node;
   searching for an area of commonly overlapped allocatable resources in the available resources of the transmitting node and the available resource of the receiving node;
   calculating the number of allocation resources based on a size of data to transmit or to receive; and
   selecting areas corresponding to the calculated allocation resource number according to an allocation condition that is set in the allocatable resource area and allocating the selected areas to the transmitting node or the receiving node, wherein the calculating of the number of allocation resources comprises calculating the number of allocation resources that are allocated within a frame based on ⌈b/⌈b/a⌉⌉, when the number of an allocatable resource area within a frame is a and the number of resource areas necessary for transmitting all data is b, where ⌈a⌉ is a maximum integer that does not exceed a.

2. The method of claim 1, wherein in a frame in which the resource areas are arranged along a time axis and a frequency axis and comprising a plurality of packet data unit (PDU) slots in which data are transmitted and received, the searching of an area of commonly overlapped allocatable resources comprises searching for the allocatable resource area in consideration of at least one of:

a position A of PDU slots in which the transmitting node can transmit;

a position B of PDU slots in which the receiving node can receive;

a position C of all frequency areas within a time domain in which the transmitting node is presently receiving data; and a position D of all frequency areas within a time domain in which the receiving node is presently transmitting data.

3. The method of claim 2, wherein the searching for an area of commonly overlapped allocatable resources comprises selecting areas satisfying {(A∩B)−C}−D among available resources of the transmitting node and the receiving node as the allocatable resource area.

4. The method of claim 2, wherein the position of a PDU slot in which the transmitting node can transmit represents a position of PDU slots corresponding to a position of acknowledgement (ACK) slots that are determined as slots that are not being used based on a result achieved by performing carrier sensing of ACK slots or collecting allocation area information of adjacent nodes, and the position of a PDU slot in which the receiving node can receive represents a position of PDU slots that are not being used based on a result achieved by performing carrier sensing of PDU slots or collecting allocation area information of neighbor nodes.

5. The method of claim 1, wherein the allocating of the areas comprises allocating, if an allocatable resource area exists within a time domain in which the node is already transmitting, an area according to an allocation condition that selects at least one of PDU slots of other frequency domains within a corresponding time domain as an allocation area.

6. The method of claim 1, wherein the allocating of the areas comprises allocating, if an allocatable resource area does not exist within a time domain in which the node is already transmitting, an area according to an allocation condition that selects at least one of PDU slots a plurality of frequency/time domains within the allocatable resource area as an allocation area.

7. The method of claim 1, wherein the allocating of the areas comprises allocating an area according to an allocation condition that selects a plurality of time domains as an allocation area when all data can be transmitted through an allocatable resource area within a frame duration.

8. The method of claim 1, wherein the allocating of the areas comprises allocating, if a transmitting node wants to get transmission range wider than current transmission range, an area according to an allocation condition that preferentially selects PDU slots having the same frequency domain from a plurality of time domains as an allocation area.

9. The method of claim 1, wherein the number b of resource areas necessary for transmitting all data is calculated based on a total amount of data to transmit or to receive and the number of data bits that can be sent to one resource area, and the number of data bits that can be sent to the one resource area is determined based on the carrier number, the symbol number, a modulation method, and a channel coding method of a resource unit constituting a resource area.

10. An apparatus for allocating resources to a node in a mobile wireless network system comprising a plurality of nodes, the apparatus comprising:

a resource area search unit that searches for available resources of a transmitting node and that searches for available resources of a receiving node;

a common resource acquisition unit that searches for an area of commonly overlapped allocatable resources in the available resources of the transmitting node and the available resources of the receiving node;

an allocation number calculation unit that calculates the number of allocation resources based on a size of data to transmit or to receive; and an allocation processor that selects areas corresponding to the calculated allocation resource number according to an allocation condition that is set in the allocatable resource area and that allocates the selected areas to the transmitting node or the receiving node, wherein the allocation number calculation unit calculates the number of resource areas that are allocated within a frame based on ⌈b/⌈b/a⌉⌉, when the number of allocatable resource areas within a frame is a and the number of resource areas necessary for transmitting all data is b, where ⌈a⌉ is a maximum integer that does not exceed a.

11. The apparatus of claim 10, wherein in a frame in which the resource areas are arranged along a time axis and a frequency axis and comprising a plurality of PDU slots in which data are transmitted and received, the common resource acquisition unit selects areas satisfying {(A∩B)−C}−D among available resources of the transmitting node and the receiving node as the allocatable resource area based on:

a position A of PDU slots in which the transmitting node can transmit;

a position B of PDU slots in which the receiving node can receive;

a position C of all frequency areas within a time domain in which the transmitting node is presently receiving data; and a position D of all frequency areas within a time domain in which the receiving node is presently transmitting data.

12. The apparatus of claim 10, wherein the allocation processor selects and allocates, if an allocatable resource area exists within a time domain in which the node is already transmitting, areas corresponding to the number of allocation resources from frequency domains that can allocate resources within a corresponding time domain.

13. The apparatus of claim 10, wherein the allocation processor selects and allocates, if an allocatable resource area does not exist within a time domain in which the node is already transmitting, areas corresponding to the number of allocation resources from a plurality of frequency domains within the allocatable resource area.

14. The apparatus of claim 10, wherein the allocation processor selects and allocates areas corresponding to the allocation resource number from a plurality of time domains when all data can be transmitted through an allocatable resource area within a frame duration.

15. The apparatus of claim 10, wherein the allocation processor preferentially selects and allocates, if a transmitting node wants to get transmission range wider than current transmission range, PDU slots corresponding to the allocation resource number, having the same frequency domain from a plurality of time domains.

* * * * *